United States Patent [19]

Blount

[11] Patent Number: 4,910,292

[45] Date of Patent: Mar. 20, 1990

[54] WATER-DISSIPATABLE POLYESTER RESINS AND COATINGS PREPARED THEREFROM

[75] Inventor: William W. Blount, Surgoinsville, Tenn.

[73] Assignee: Eastman Kodak Company, Rochester, N.Y.

[21] Appl. No.: 258,295

[22] Filed: Oct. 14, 1988

[51] Int. Cl.$^4$ .............................................. C08G 63/02
[52] U.S. Cl. ..................... 528/272; 528/277; 528/294; 528/295; 528/296; 528/302; 528/308; 528/308.6; 523/500
[58] Field of Search .............. 528/272, 277, 294, 295, 528/296, 302, 308, 308.6; 523/500

[56] References Cited

U.S. PATENT DOCUMENTS

| | | | |
|---|---|---|---|
| 3,345,313 | 10/1967 | Ruhf et al. | 524/601 |
| 3,434,987 | 3/1969 | Dhein et al. | 106/252 |
| 3,494,882 | 2/1970 | Andrews | 524/557 |
| 3,549,577 | 12/1970 | Stromberg | 524/598 |
| 3,563,942 | 2/1971 | Heiberger | 524/602 |
| 3,666,698 | 5/1972 | Harris et al. | 260/404.8 |
| 3,699,066 | 10/1972 | Hunsucker | 523/40.2 |
| 3,734,874 | 5/1973 | Kibler et al. | 524/603 |
| 3,779,993 | 12/1973 | Kibler et al. | 528/295 |
| 4,233,196 | 11/1980 | Sublett | 524/602 |
| 4,257,928 | 3/1981 | Vachon et al. | |
| 4,304,901 | 12/1981 | O'Neill et al. | 528/290 |
| 4,340,519 | 7/1982 | Kotera et al. | 523/414 |
| 4,525,524 | 6/1985 | Tung et al. | 524/601 |
| 4,622,381 | 11/1986 | Suzuki et al. | 528/295 |
| 4,698,391 | 10/1987 | Yacobucci et al. | 525/162 |
| 4,737,551 | 4/1988 | Dervan et al. | 525/440 |

FOREIGN PATENT DOCUMENTS 1117126 3/1979 United Kingdom .
2097005A 10/1982 United Kingdom .

OTHER PUBLICATIONS

Defensive Publication 868 O.G. 730 published Nov. 18, 1969, by Lappin et al. entitled "Basic-Dyeable Polyesters Containing an Alkali Metal Salt of a Sulfodiphenylether Dicarboxylic Acid or Its Ester".

*Primary Examiner*—John Kight
*Assistant Examiner*—S. A. Acquah
*Attorney, Agent, or Firm*—Mark A. Montgomery; William P. Heath, Jr.; Thomas R. Savitsky

[57] ABSTRACT

Disclosed is a water-dissipatable polyester containing a sulfonate group and at least 10 mole percent of a multifunctional or branch-inducing moiety. The polyester is useful to prepare coatings such as paints.

13 Claims, No Drawings

WATER-DISSIPATABLE POLYESTER RESINS AND COATINGS PREPARED THEREFROM

FIELD OF INVENTION

The present invention relates to novel water-dissipatable polyesters and coatings prepared therefrom having excellent humidity resistance.

BACKGROUND OF THE INVENTION

Regulations to limit the amount of volatile organic compound content (VOC) of industrial coatings has encouraged research and development projects directed at inventing new waterborne systems such as paints. With respect to the two most important commercial coating systems, polyesters and acrylics, it is a relatively easy task to characterize the current state-of-the-art: polymeric systems with a carbon backbone (acrylics) are more stable to hydrolysis then polyesters with their carbon-oxygen ester backbone chain. However, considerable research continues toward improving the stability of aqueous polyesters because of their inherently desirable properties of excellent hardness/flexibility ratios and outstanding gloss unattainable from aqueous acrylic systems.

U.S. Pat. No. 4,340,519 discloses the composition of certain crystalline and non-crystalline polyesters copolymerized with a metal sulfonate group-containing aromatic acid and up to 10 mole percent (based on the total polyol content) of a polyvalent polyol selected from trimethylolpropane, trimethylolethane, glycerine, and pentaerythritol. Also, U.S. Pat. No. 4,525,524 discloses liquid systems comprised of polyesters containing certain metal sulfonates and, optionally, up to 3 percent of a branching agent based upon the total diol component. Neither of these disclose the use of greater than 10 percent of branch-inducing reactants.

U.S. Pat. No. 3,563,942 discloses linear solvent-soluble copolyester compositions that can be dispersed in water. Water dispersibility is gained by the addition to the copolyester of a small amount (1–2 mole percent) of the metal salt of sulfonated aromatic compounds.

Many patents disclose methods to obtain water-dissipatable polyesters by neutralizing residual or unreacted carboxylic acid groups on the polymer with ammonia or various organic amines. U.S. Pat. No. 3,666,698 utilizes this method as well as phenylindandicarboxylic acid to modify coating performance. U.S. Pat. No. 3,699,066 shows the benefits of certain hydroxyfunctional amines for neutralization. U.S. Pat. No. 3,549,577 utilizes the aminoresin crosslinker as the neutralizing agent then adjusts the pH to prepare an alkaline water-reduced system. In these patents as well as U.S. Pat. Nos. 3,494,882, 3,434,987, U.K. Pat. No. 1,117,126, and U.S. Pat. No. 3,345,313 carboxylic acid functionality is completely neutralized with excess base yielding an alkaline paint vehicle.

All of the U.S. patents and other references disclosed herein are incorporated herein by reference in their entirety.

SUMMARY OF THE INVENTION

The present invention is directed to a water-dissipatible polyester having carbonyloxy linking groups (i.e., ester groups of the formula

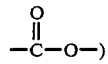

in the linear molecular structure wherein up to 80% of the linking groups are carbonylamido linking groups, (i.e., amide groups of the formula

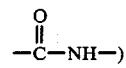

the polymer having an ASTM D 4287 viscosity of from about 5 poise (P) to about 50 P at 200° C., the polymer comprising the reaction products of reactants (a), (b), (c), (d), and (e) or the ester forming or esteramide forming derivatives thereof, wherein all stated mole percentages are based on the total of all acid, hydroxyl and amino group containing reactants being equal to 200 mole %, and wherein the polymer contains proportions of acid-group containing reactants (100 mole % acid) to hydroxy- and amino-group containing reactants (100 mole % base) such that the value of EQ (base) divided by EQ (acid) is between 0.5 and 2.0, as follows:

(a) at least one difunctional dicarboxylic acid which is not a sulfomonomer;

(b) from about 2 to about 25 mole % of at least one difunctional sulfomonomer containing at least one metallic sulfonate group or nitrogencontaining non-metallic sulfonate group attached to an aromatic or cycloaliphatic nucleus wherein the functional groups are hydroxy, carboxyl or amino;

(c) at least one difunctional reactant selected from a glycol or a mixture of a glycol and diamine having two —NRH groups, the glycol containing two $C(R^1)_2$—OH groups;

(d) from none to about 40 mole % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants; and (e) greater than 10 mole % of a multifunctional reactant containing at least three functional groups selected from the group consisting of hydroxyl, carboxyl, and a mixture thereof, wherein each R in the (c) and (d) reactants is, independently, a hydrogen atom or an alkyl group of 1 to 4 carbons, and each $R^1$ in the (c) reactant is, independently, a hydrogen atom, an alkyl group of 1 to 4 carbon atoms, or an aryl group of 6 to 10 carbon atoms.

Preferred alkyl groups are methyl, ethyl, n-propyl, isopropyl, n-butyl, sec-butyl and iso-butyl; preferred aryl groups are phenyl and nephthyl.

As used herein the term "multifunctional" or "branch-inducing" refers to a compound having three or more reactive hydroxyl and/or carboxyl substituents such as a triol or a tricarboxylic acid; the term "glycol" refers to a compound having two hydroxyl substituents; the term "polyol" refers to a compound having at least two hydroxyl substituents; the term "water-dissipatable polyesters," "water-dissipatable polymer," "polyester material," or "the polyester" refers to the polyester or polyesteramide described above.

The present invention is also directed to coating compositions containing the polyester material and will be described hereinafter. The present invention is also directed to a multi-step process for preparing the polyester material.

DETAILED DESCRIPTION OF THE INVENTION

Whenever the term "water-dissipatable" or "water-dispersible" is used in this description, it will be understood to refer to the activity of a water or aqueous solution on the polymer. The term is specifically intended to cover those situations wherein the solution dissolves and/or disperses the polyester material therein and/or therethrough.

The term "EQ(base)" means the total number of equivalents of all (100 mole % base) of the hydroxyl and amino functionality from (b), (c), (d) and (e). This total is obtained by multiplying the number of moles of each reactant in this grouping by its functionality, i.e., the total number of hydroxyl plus amino groups per mole of reactant which are available for condensation polymerization with acid (or ester) groups; and the term "EQ(acid)" means the total number of equivalents of all (100 mole % acid) of the acid functionality from (a), (b), (d) and (e). This total is obtained by multiplying the number of moles of each reactant in this grouping by its functionality, i.e., the total number of acid groups (or equivalent ester forming derivatives thereof) which are available for condensation polymerization with hydroxyl and amino groups.

A single reactant from (b), (d) and (e) may contain both acid and hydroxy and/or amino functional groups. For the purposes of satisfying the relationship between the total number of moles of hydroxy- and amino-bearing reactants (100 mole % base) and the total number of moles of acid-bearing reactants (100 mole % acid) as well as the values of EQ(base) and EQ(acid), a reactant of this type is treated in the following manner: The molar and equivalent amounts of such reactants are proportionally distributed based on the ratio of the two types of functional groups. For example, when a water dissipatable polyester resin of this invention is manufactured by reacting 0.8 mole of 2,2-dimethyl-1,3-propanediol (NPG) (reactant type (c) having two hydroxyl groups per mole), 0.05 mole of 5-sodiosulfoisophthalic acid (5-SSIPA) (reactant type (b) having two acid groups per mole), 0.30 mole of 2-methyl-2-carboxy-1,3-propanediol (MCPD) (reactant type (e) having two hydroxyl groups and one acid group per mole), and 0.95 mole of isophthalic acid (IPA) (reactant type (a) having two acid groups per mole) the molar percentages and EQ values are:

| Base Components | | | | Acid Components | | | |
|---|---|---|---|---|---|---|---|
| Reactant | Moles | EQ (base) | Mole % | Reactant | Moles | EQ (acid) | Mole % |
| NPG | 0.80 | 1.6 | 80.0 | 5-SSIPA | 0.05 | 0.10 | 5.0 |
| DMPA | 0.20 | 0.4 | 20.0 | DMPA | 0.10 | 0.10 | 10.0 |
| | | | | IPA | 0.85 | 1.70 | 85.0 |
| Totals | 1.20 | 2.0 | 100.0 | | 1.00 | 1.90 | 100.0 |

EQ(base)/EQ(acid) = 2.0/1.9 = 1.053

Reactant (b) in the polyester of the present invention is a difunctional monomer containing a —SO₃M group attached to an aromatic nucleus, wherein M is hydrogen or a metal ion. This difunctional monomer component may be either a dicarboxylic acid (or derivative thereof) containing a —SO₃M group or a diol containing a —SO₃M group. The metal ion of the sulfonate salt group may be $Na+$, $Li+$, $K+$, $Mg++$, $Ca++$, $Cu++$, $Fe++$, or $Fe+++$; preferred are monovalent cations.

The —SO₃M group is attached to an aromatic nucleus, examples of which include benzene, naphthalene, anthracene, diphenyl, oxydiphenyl, sulfonyldiphenyl, and methylenediphenyl.

Especially good results are obtained when the difunctional monomer is the sodium salt of a sulfoisophthalic, sulfoterephthalic, sulfophthalic, or 4-sulfonaphthalene-2,7-dicarboxylic acid (or derivatives of such acids). A highly preferred such monomer is 5-sodiosulfoisophthalic acid or a derivative thereof such as 5-sodiosulfodimethyl isophthalate. Other preferred difunctional monomers are lithium 5-sulfoisophthalic acid, dimethyl lithium 5-sulfoisophthalate, potassium 5-sulfoisophthalic acid, and dimethyl potassium 5-sulfoisophthalate.

Other effective difunctional monomers containing a —SO₃M group attached to an aromatic nucleus include metal salts of aromatic sulfonic acids (or esters thereof). These monomers have the general formula

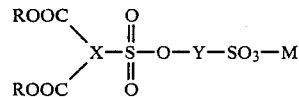

wherein X is a trivalent aromatic hydrocarbon radical, Y is a divalent aromatic hydrocarbon radical, R is hydrogen or an alkyl group of one to four carbon atoms, M is hydrogen $Na+$, $Li+$, or $K+$. Examples of preferred monomers here are 4-sodiosulfophenyl-3,5-dicarbomethoxybenzenesulfonate, 4-lithiosulfophenyl-3,5-dicarbomethoxybenzenesulfonate and 6-sodiosulfo-2-naphthyl-3,5-dicarbomethoxybenzenesulfonate.

Other effective difunctional monomers containing a —SO₃M group attached to an aromatic nucleus include metal salts of sulfodiphenyl ether dicarboxylic acids (or esters thereof). These monomers have the general formula

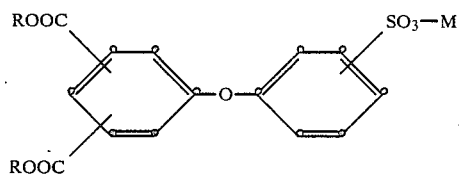

wherein R is hydrogen, an alkyl group of one to eight carbon atoms, or phenyl, and M is hydrogen, $K+$, $Na+$, or $Li+$. These monomers are described, including methods for their preparation in Lappin, et al. Defensive Publication, 868 O.G. 730, on November 18, 1969. Examples of preferred monomers here are dimethyl 5-[4-(sodiosulfo)phenoxy]isophthalate, dimethyl 5-[4-(sodiosulfo)phenoxy]terephthalate, and 5-[4-(sodiosulfo)phenoxy]isophthalic acid. Other such monomers are disclosed in U.S. Pat. No. 3,734,874, incorporated herein by reference in its entirety.

The nonmetallic portion of the nonmetallic sulfonate group optionally present in reactant (b) is a nitrogen-based cation derived from nitrogen-containing bases which may be aliphatic, cycloaliphatic or aromatic basic compounds that have ionization constants in water at 25° C. of $10^{-3}$ to $10^{-10}$, preferably $10^{-5}$ to $10^{-8}$. Especially preferred nitorgen containing bases are ammonia, dimethylethanolamine, diethanolamine, triethanolamine, pyridine, morpholine, and piperidine. Such nitrogen-containing bases and cations derived therefrom are described in U.S. Pat. No. 4,304,901, incorporated herein by reference.

It is preferred that reactant (b) is present in an amount of from about 3 to about 20 mole percent, more preferred is about 3 to about 9 mole percent; and most preferred is about 3 to about 6 mole percent.

In the water-dissipatable polymer it is preferred that very minor, e.g., less than about 10 mole percent based on all reactants, of reactant (d) is employed, that at least about 70 mol percent of reactant (c) is glycol, and that not more than about 85 percent of all the hydroxy equivalents is present in the glycol.

The dicarboxylic acid component (reactant (a)) of the polyester comprises aliphatic dicarboxylic acids, alicyclic dicarboxylic acids, aromatic dicarboxylic acids, or mixtures of two or more of these acids. Examples of such dicarboxylic acids include oxalic; malonic; dimethylmalonic; succinic; glutaric; adipic; trimethyladipic; pimelic; 2,2-dimethylglutaric; azelaic; sebacic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; 2,5-norbornanedicarboxylic; 1,4-naphthalic; diphenic; 4,4'-oxydibenzoic; diglycolic; thiodipropionic; 4,4'-sulfonyldibenzoic; and 2,5-naphthalenedicarboxylic acids and esters thereof.

Preferred difunctional dicarboxylic acids (reactant (a)) include isophthalic acid, terephthalic acid, phthalic anhydride (acid), adipic acid, tetrachlorophthalic anhydride, pivalic acid, dodecanedioic acid, sebacic acid, azelaic acid, 1,4-cyclohexanedicarboxylic acid, 1,3-cyclohexanedicarboxylic acid, maleic anhydride, fumaric acid, succinic anhydride (acid), 2,6-naphthalenedicarboxylic acid, glutaric acid and esters thereof.

It is preferred that reactant (c) is a glycol or mixture of glycols. The glycol component may consist of aliphatic, alicyclic, and aralkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Examples of other suitable glycols are poly(ethylene glycols) which include diethylene glycol, triethylene glycol, tetraethylene glycol, and pentaethylene, hexaethylene, heptaethylene, octaethylene, nonaethylene, and decaethylene glycols, and mixtures thereof. A preferred poly(ethylene glycol) employed in the polyester of the present invention is diethylene glycol or triethylene glycol or mixtures thereof. Copolymers may be prepared from two or more of the above glycols. Preferred glycols include ethylene glycol, diethylene glycol, 2,2,4-trimethyl-1,3-pentanediol, 1,4-cyclohexanedimethanol, 1,3-cyclo-hexanedimethanol, hydroxypivalyl hydroxypivalate, dipropylene glycol, 1,6-hexanediol, 1,10-decanediol, 1,3-butanediol, hydrogenated bisphenol A, 1,4-butanediol and the like.

Advantageous difunctional components which are aminoalcohols include aromatic, aliphatic, heterocyclic and other types as in regard to component (d). Specific examples include 5-aminopentanol-1, 4-aminomethylcyclohexanemethanol, 5-amino-2-ethyl-pentanol-1, 2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —C(R)$_2$—OH group.

Advantageous difunctional monomer components which are aminocarboxylic acids include aromatic aliphatic, heterocyclic, and other types as in regard to component (d) and include lactams. Specific examples include 6-aminocaproic acid, its lactam known as caprolactam, omega-aminoundecanoic acid, 3-amino-2-dimethylpropionic acid, 4-(β-aminoethyl)benzoic acid, 2-(β-aminopropoxy)benzoic acid, 4-aminomethylcyclohexanecarboxylic acid, 2-(β-aminopropoxy)cyclohexanecarboxylic acid, etc. Generally these compounds contain from 2 to 20 carbon atoms.

Advantageous examples of difunctional monomer component (d) which are diamines include ethylenediamine; hexamethylenediamine; 2,2,4-trimethylhexamethylenediamine; 4-oxaheptane-1,7-diamine; 4,7-dioxadecane-1,10-diamine; 1,4-cyclohexanebismethylamine; 1,3-cycloheptamethylenediamine; dodecamethylenediamine, etc.

Reactant (e) preferably contain 3 to 6 hydroxyl and/or carboxyl groups; most preferred is trimethylolpropane (TMP), trimethylolethane (TME), glycerine, pentaerythritol, erytritol, threitol, dipentaerythritol, sorbitol, trimellitic anhydride, pyromellitic dianhydride, or dimethylolpropionic acid.

It is preferred that reactant (e) is present in an amount of 12 to 35 mole percent, more preferred is about 15 to about 30 mole percent.

In other more preferred emobimetns of the invention: the water-dissipatable polyester comprises an acid component (moiety) of from about 90 to about 10 mole percent isophthalic acid, about 90 to about 10 mole percent adipic acid and from about 25 to 2 mole percent 5-sodiosulfoisophthalic acid, and a polyol component (moiety) of from about 65 to about 100 mole percent neopentyl glycol, 1,4-cyclohexanedimethanol, ethylene glycol, or a mixture thereof (the term "moiety" as used herein designates the residual portion of the reactant acid or polyol which actually enters into or onto the polymer chain during the condensation or polycondensation reaction); the ICI viscosity at 200° C. of the water-dissipatable polyester is from about 15 P to about 30 P; said acid component (moiety) comprises from about 75 to about 25 mole percent isophthalic acid, from about 75 to about 25 mole percent adipic acid, and from about 3 to about 9 mole percent 5-sodiosulfoisophthalic acid, and the glycol component (moiety) comprises from about 80 to about 85 mole percent neopentyl glycol (NPG). When reactant (e) is a triol it is preferred that the polyol component (moiety) is from about 65 to about 88 mole percent neopentyl glycol, 1,4-cyclohexanedimethanol, ethylene glycol, or a mixture thereof.

The weight average molecule weight of the polyester is preferably about 5,000 to about 25,000; more preferred is about 10,000 to about 20,000.

The number average molecule weight of the polyester is preferably about 1,000 to about 5,000; more preferred is about 1,500 to about 3,500.

It is preferred that the acid number of the polyester is less than 20, more preferred is less than 10.

It is preferred that the glass transition tempeature (Tg) of the polyester is greater than 10° C., more preferred is greater than 30° C. Depending on the particular Tg, the polyester can be either coldflowing or non-coldflowing.

An aqueous dispersion of the polyester is preferably stable. Stability is defined as the absence of polymer coagulation or phase separation of an aqueous polyester preparation (15 to 45 weight percent polyester solids) after shelf storage for a minimum of four months at about 20° to 30° C.

The polyester is preferably non-caking and grindable by conventional techniques such as by use of a cryogenic hammer mill.

The polyester also preferably has an ASTM D 4287 viscosity (I.C.I. plate and cone viscosity) of about 5 P to about 50 P at 200° C.; more preferred is about 15 to 30 P.

The polyester can be prepared by methodology that is the same or similar to that disclosed in the art, e.g., in U.S. Pat. Nos. 3,734,874; 3,779,993; and 4,233,196; the disclosures of which are incorporated herein by reference in their entirity. A two-step (i.e., preparation by staging) is preferred when the metal sulfonate group-containing reactant (b) is diacid and, therefore, included in the calculation of EQ(acid). The two-step process for preparation of the polyester comprises (i) contacting the total amount of reactant (b) (100%) to be reacted with sufficient base functionality (hydroxy- and amino-containing reactants) selected from reactants (c), (d) and (e) and sufficient acid functionality selected from reactants (a) and (e) in the presence of a catalytic amount of a catalyst under conditions such that substantially all of the acid functionality of reactant (b) is esterified and an intermediate reaction product is formed which has a ratio of EQ(base) to EQ(acid) calculated from the reactants reacted in step (i) of between 2 and 4, and (ii) contacting the intermediate reaction product formed by step (i) with all remaining reactants in the presence of a catalytic amount of a catalyst such that the desired water-dissipatable polyester is formed.

A preferred temperature for this two step process is about 160°–240° C., more preferred is about 180°–230° C. The catalyst is preferably an organo-metallic compound especially a tin or titanium containing compound. Examples include dibutyltinoxide, stannous oxalate, butylstannoic acid, and titaniumtetraisopropoxide. The catalytic amount is preferably about 0.1%, based on the total weight of reactants. It is preferred that about 25–35% of reactant (a), about 80–100% of reactant (c), about 50–100% of reactant (d) and about 0–100% of reactant (e) are reacted in step (i) and, conversely, about 65–75% of reactant (a), about 0–20% of reactant (c), about 0–50% of reactant (d), and about 0–100% of reactant (e) are reacted in step (ii). These percentages as used in this context are based on the total moles of each of the reactants to ultimately be reacted (i.e., (a), (b), (c), (d), and (e)) to each be equal to 100 mole %.

The particular polyester can be isolated neat; however, it is desirable for typical material handling purposes to prepare a dispersion or solution of the polyester. This dispersion or solution comprises about 10 to about 50 weight percent of liquid which comprises about 0 to about 90 weight percent water and about 10 to about 100 weight percent of a suitable oxygen-containing organic solvent such as alcohols, ketones, esters and ethers; preferred are low molecular weight alcohols such as $C_1$–$C_{10}$ alcohols, e.g., ethanol, n-propanol, isopropanol, and iso-butanol. Such a dispersion can be used as a coating composition or can be used as a predispersion to prepare a coating composition. It is usually not necessary to neutralize the residual acid functionality on the polyester. The pH of such a dispersion is preferably about 2 to about 6; more preferred is about 3 to about 5.

The coating composition of the present invention comprises (A) about 15 to about 45 percent, based on the weight of the total composition, of polyester material, (B) about 45 to about 80 percent, based on the weight of the total coating composition, of water, (C) about 0 to about 30 percent, based on the weight of the total coating composition, of a suitable oxygen-containing organic solvent, and (D) about 0 to about 40 percent, based on the weight of the polyester, of a crosslinking agent.

Preferred amounts of (A) are about 20 to about 40 percent; more preferred are about 25 to about 35 percent.

Preferred amounts of (B) are about 60 to about 75 percent; more preferred are about 67 to about 72 percent. Preferred amounts of (C) are about 3 to about 10 percent; more preferred are about 4 to about 6 percent. Preferred amounts of (D) are about 5 to about 40 percent; more preferred are about 20 to about 40 percent, and most preferred are about 25 to about 35 percent.

As appreciated in the art, the exact components and properties of components desired for any given coating application can vary, and therefore, routine experimentation may be required to determine the optional components and proportions of components for a given application and desired properties.

Preferred crosslinking agents contain substituted melamine and urea resins or residues such as hexamethoxymethylmelamine, hexabutoxymethylmelamine, tetramethoxymethylurea, or tetrapropoxymethylurea.

The coating composition optionally contains up to about 70 weight percent based on the weight of polyester of one or more additional coating additives.

A preferred amount of coating additives is about 1 to about 30 percent. Examples of such coating additives include flow control additives such as silicones, fluorocarbons, or cellulosics; coalescing solvents such as diethylene glycol monobutyl ether, trimethylpentanediol mono-isobutyrate, or ethylene glycol mono-octyl ether; strong acids such as p-toluenesulfonic acid, trichloroacetic acid, or trifluoromethanesulfonic acid; pigments such as titanium dioxide, barytes, clay, or calcium carbonate; colorants such as phthalocyanine blue, molybdate orange, or carbon black; biocides such as tin compounds (e.g., tributyltin oxide), quaternary ammonium compounds, or iodine compounds; thickeners such as carboxymethyl cellulose, hydroxypropyl methyl cellulose, ethyl hydroxyethyl cellulose, guar gum and the like.

The Gardner-Holdt viscosity of the coating composition is preferably about T to about Z3; more preferred is about W to about Z1.

The coating composition can be prepared by the techniques described herein and/or by techniques known in the art, e.g., as disclosed in U.S. Pat. Nos. 4,698,391, 4,737,551, and 3,345,313; the disclosures of which are incorporated herein by reference in their entirety.

The coating composition can be coated into a substrate and crosslinked using techniques known in the art; e.g., by spray-applying 3 to 4 mils of wet coating and baking in a 150° C. forced air oven for 30 minutes.

The substrate can be any common substrate such as paper; polyester films such as polyethylene or polypropylene; metals such as aluminum or steel; glass; urethane elastomers, primed (painted) substrates; and the like.

The coating composition is preferably a paint such as a clear or pigmented enamel, a lacquer, an ink or a varnish.

After the coating composition is coated onto a substrate and cured (i.e., crosskinked) such cured coating has many desirable properties such as good pencil hardness, good gloss, good flexibility, good stain resistance, good humidity resistance, good impact resistance, and good MEK double rub solvent resistance.

Preferred pencil hardness (mar/cut) is about B to about 3 H; more preferred is about F/3 H; preferred impact resistance (direct) is about 20 to about 160 in lbs., more preferred is about 160 in lbs.; preferred impact resistance (reverse) is about 10 to about 150 in lbs., or more preferred is about 150 in lbs.; preferred gloss at 20° C. is about 60% to about 80%, more preferred is about 80%; preferred gloss at 60° is about 70% to about 100%, more preferred is about 99%; preferred MEK double rub resistance at least is about 200, preferred is at least about 250; preferred 5 minute iodine stain resistance is about 7 to about 10, more preferred is about 8 to 10 with 10 being equal to no stain; preferred 30 minute iodine stain resistance is about 5 to about 10, more preferred is about 6 to 10; preferred humidity resistance (100 hours at 60° C.) is about 70 to about 100 gloss retention, preferred is about 88-100 gloss retention; and preferred conical mandrel flexibility (⅛ inch, % pass) is about 80 to about 100% pass, more preferred is about 100% pass.

The applicable tests procedures as described herein are as follows:
1. Acid Value of resins (ASTM Method D 465)
2. Testing Coated Metal Specimens at 100 Percent Relative Humidity—Cleveland humidity (ASTM Method D 2247)
3. Ford Cup Viscosity (ASTM Method D 1200)
4. Molecular Weight (Gel Permeation Chromatography)
5. Gardner-Holdt Bubble Viscosity (ASTM Method D 1545)
6. Film Thickness (General Electric Gage, Type B)
7. Film Hardness (Pencil Method)
8. Solvent resistance (Methylethyl ketone (MEK) dynamic rub test (ASTM Method D 1308)
9. Staining Tests (ASTM Method D 1540)
10. Specular Gloss (ASTM Method D 523)
11. Hegmann Fineness-of-Dispersion (ASTM Method D 1210)
12. I.C.I. Cone and Plate Viscosity (ASTM Method D 4287)

The following examples are to illustrate the invention but should not be interpreted as a limitation thereon

EXAMPLES

Example 1

Referring to the First Stage Charge of Table 1, 3, or 5, mix the NPG glycol, TMP or alternate branch-inducing polyol, half the total IPA requirement, 5-SSIPA and half the total catalyst in a three-liter reactor equipped with a heating mantle, agitator, nitrogen sparge, temperature probe, partial condenser, water trap and full condenser. Heat the contents slowly to avoid scorching until the slurry can be stirred, then upheat gradually to 175° C. over one hour. Maintain a temperature between 175°-180° C. until the solution clears (Acid Value=50, Condensate=50 g). It is not necessary or desirable to process the first stage product to a low acid value.

Charge the second stage reactants with the additional NPG glycol added last. Increase the temperature to 175° C. (15 minutes) then to 205° C. (approximately 10° C. every 30 minutes). Process at this upper temperature until and acid value of 4–8 and a 150° C. ICI Cone and Plate viscosity of 50–60 P are obtained. The yield is nearly 1000 grams or about 86% based on condensate loss.

Example 2

To prepare an aqueous pre-dispersion of the resin of Table 1, adjust the temperature of the reaction product synthesized as described in Example 1 to 80° C. Add 20 grams isopropanol per 100 grams of resin, stir this mixture and slowly add 20 grams distilled water per 100 grams resin with continued agitation. High shear is not necessary and may cause excess foaming. This slightly bluish-gray, clear dispersion has a high Gardner-Holdt viscosity (>Z9) but, when heated to 40°-50° C., falls rapidly to Z3-Z5.

Example 3

The resin of Table 3 can be pulverized to course, 35 mesh granules in a laboratory blender, cryogenic hammer mill, thin blade mixer or other suitable device. The granules do not fuse on storage and can be used in a single operation to prepare an aqueous dispersion of a completely formulaed, crosslinkable enamel. In the following preparation, high shear is not necessary and may cause excess foaming:

Preheat to 80° C. a mixture of 100 parts granules made from the resin of Table 3, 20 parts n-propanol, and 20 parts distilled water. Add 42.9 parts hexamethoxymethylmelamine (HMMM). In a separate container prepare a solution of distilled water (136 parts), p-toluenesulfonic acid (0.4 parts), flow control additive (0.025 part), and an optional coalescing solvent such as diethylene glycol monobutyl ether (1.0 part). Drop this solution into the resin/crosslinker pre-dispersion over a period of about 30 minutes using mdoerate stirring.

Example 4

Stable enamel dispersions were prepared by letting down the predispersion/crosslinking resin mixture with water at a temperature slightly below the reflux temperature of the water/alcohol mixture. In this manner, 140 grams of the pre-dispersion of Example 2 was blended with 42.9 grams of hexamethoxymethylmelamine and heated to 70°-80° C. In a separate container a solution of distilled water (136 parts), p-toluenesulfonic acid (0.4 parts), flow control additive (0.025 part), and an optional coalescing solvent such as diethylene glycol monobutyl ether (1.0 part) was prepared. The aqueous soltuion is added with stirring over a 30 minute period while maintaining 70°-80° C. A stable, milk-white aqueous enamel is obtained.

Example 5

A white aqueous enamel was prepared by preheating a mixture of 100 parts polyester resin of Table 3, 20 parts iso-propanol, and 20 parts distilled water. When a homogeneous viscous solution is obtained add 42.9 parts hexamethoxymethylmelamine, then 5 part increments of distilled water until a 25° C. Gardner-Holdt viscosity of Z1 to Z3 is obtained. Transfer the contents to a thin blade laboratory blender, add 95.2 parts of rutile titanium dioxide and grind at a medium speed for 15–20 minutes or until a Hegmann grind fineness of 7–8 is obtained.

TABLE 1

| Reactants | Equivalents | Moles | Grams |
|---|---|---|---|
| First Stage | | | |
| NPG Glycol | 7.510 | 3.755 | 391.2 |
| Trimethylolpropane (TMP) | 2.031 | 0.677 | 90.8 |
| Isophthalic Acid | 2.408 | 1.204 | 200.0 |
| 5-Sodiosulfoisophthalic Acid | 0.242 | 0.121 | 32.3 |
| Butylstannoic Acid Catalyst | — | — | 0.5 |
| Second Stage | | | |
| Isophthalic Acid (IPS) | 2.402 | 1.201 | 199.5 |
| Adipic Acid | 3.358 | 1.679 | 245.3 |
| Butylstannoic Acid Catalyst | | — | 0.5 |

TABLE 2

RESIN PROPERTIES

| EQ(Base)/EQ(Acid) - First Stage | 3.600 |
|---|---|
| EQ(Base)/EQ(Acid) - Final | 1.134 |
| Acid number | 4–8 |
| Calculated hydroxyl value | 60–64 |
| Molecular weight (GPC) | |
| Number average | 2000 |
| Weight average | 12200 |
| ICI viscosity at 150° C. (302° F.), P | 54 |
| Pre-dispersion | |
| Nonvolatiles, wt % | 71.4 |
| Solvent (50/50) | Isopropanol/Water |
| Gardner-Holdt viscosity, 50° C. | Z3 |
| Gardner Color | 1 |
| Density, lb/gal | 9.08 |

TABLE 3

| Reactants | Moles | Grams |
|---|---|---|
| First Stage | | |
| NPG Glycol | 3.657 | 380.9 |
| Trimethylolpropane (TME) | 0.787 | 94.6 |
| Isophthalic Acid | 1.500 | 249.2 |
| 5-Sodiosulfoisophthalic Acid (5-SSIPA) | 0.128 | 34.3 |
| Butylstannoic Acid Catalyst | — | 0.5 |
| Second Stage | | |
| Isophthalic Acid (IPS) | 1.483 | 246.4 |
| Adipic Acid | 1.036 | 151.4 |
| Butylstannoic Acid Catalyst | — | 0.5 |

TABLE 4

ENAMEL PROPERTIES

| Polyester/Melamine | 70/30 |
|---|---|
| Density, lb/gal | 8.81 |
| Solids, wt % | 44.2 |
| Calculated VOC, wt VOC/vol coating (minus H₂O), lb/gal | 1.6 |
| Viscosity by No. 4 Ford Cup, sec | 11 |
| COATING PROPERTIES | |
| Film thickness, mils | 0.8–1.0 |
| Pencil hardness, mar/cut | F/H |
| Impact resistance | |
| Direct, in.-lb | 160 |
| Reverse, in.-lb | 150 |
| MEK double rub solvent resistance | >250 |
| ⅛ in. Conical mandrel flexibility, % pass | 100 |
| Cleveland humidity, 100 h at 60° C. (140° F.) | |
| % Gloss retention at 20° | 88 |
| Blistering | none |
| Stain resistance (water/acetone rinse), | |

TABLE 4-continued

| 0 = no stain | |
|---|---|
| 5 minutes | 8 |
| 30 minutes | 6 |
| Gloss, % | |
| at 20° | 80 |
| at 60° | 99 |

TABLE 5

| | Moles | | | |
|---|---|---|---|---|
| Reactants/Resin Number | 1 | 2 | 3 | 4 |
| Polyol Ratio | 95/5 | 90/10 | 85/15 | 80/20 |
| First Stage | | | | |
| NPG Glycol | 4.324 | 4.069 | 3.817 | 3.570 |
| Trimethylolpropane (TMP) | .223 | .443 | .660 | .875 |
| Isophthalic Acid | 1.230 | 1.221 | 1.213 | 1.204 |
| 5-Sodiosulfoisophthalic Acid (5-SSIPA) | .120 | .120 | .120 | 120 |
| Butylstannoic Acid Catalyst | 5 (g) | .5 (g) | .5 (g) | .5 (g) |
| Second Stage | | | | |
| Isophthalic Acid | 1.229 | 1.221 | 1.212 | 1.204 |
| Adipic Acid | 1.640 | 1.628 | 1.617 | 1.605 |
| Butylstannoic Acid | .5 (g) | .5 (g) | .5 (g) | .5 (g) |

TABLE 6

| | Resin | | | |
|---|---|---|---|---|
| Reactants/Resin Number | 1 | 2 | 3 | 4 |
| Polyol Ratio | 95/5 | 90/10 | 85/15 | 80/20 |
| MEK double rub solvent resistance | 50 | 100 | >250 | >250 |
| Cleveland humidity, 100 h at 60° C. (140° F.) | | | | |
| % Gloss retention at 20° | <10 | 30 | 88 | 95 |
| Blistering | many #8 | many #8 | none | none |

Enamels can be conveniently prepared from resin granules as described in Example 3. An enamel prepared from an aqueous predispersion requires a slightly different procedure as shown in Example 4. These non-alkaline, clear enamel dispersions have a pH of 5 and have exhibited shelf stability in excess of six months. When applied to cold rolled steel panels., the enamel of Example 4 exhibited film properties shown in Table 4. Also given in Table 4 are the enamel properties at application.

The four resins which compositions are given in Table 5 were prepared by the general procedure of Example 1. Aqueous predispersions were made (Example 2) then converted to crosslinkable enamels according to Example 4. These enamels were applied to steel test panels and oven-cured at 150° C. to obtain a cured film thickness of about 1 mil. Thus prepared, each formulation was evaluated for both solvent and condensing humidity resistance. The results are shown in Table 6. A coating having these improvements would be more resistant to many deleterious effects during its lifetime. In the practice of this invention, this result was obtained by using levels of branch-inducing polyols (i.e., having greater than 2 hydroxys) greater than 10 mole percent based on total polyol content.

A fully formulated, pigmented and catalyzed, water-borne polyester enamel was prepared from the resin of Table 3 using the procedure detailed in Example 5. To effect a satisfactory rutile titanium dioxide pigment dispersion in this aqueous system, it is necessary to first adjust the viscosity of the paint vehicle (paint solids and solvents minus pigments) to a Gardner-Holdt viscosity of Z1-Z3 then conduct the pigment grind. Rheological additives and antisettling agents can be added to the grind as needed and optional pigment grinding techniques selected. Final letdown to spray viscosity is with distilled water. Other procedures such as masterbatch preparation and the use of predispersed pigments would also be acceptable.

The invention has been described in detail with particular reference to preferred embodiments thereof, but it will be understood that variations and modifications can be effected within the spirit and scope of the invention.

I claim:

1. A water-dissipatible polyester having carbonyloxy linking groups in the linear molecular structure wherein up to 80% of the linking groups are carbonylamido linking groups, the polymer having an ASTM D 4287 viscosity of from about 5 P to about 50 P at 200° C., the polymer comprising the reaction products of reactants (a), (b), (c), (d), and (e) or the ester forming or esteramide forming derivatives thereof, wherein all stated mole percentages are based on the total of all acid, hydroxyl and amino group containing reactants being equal to 200 mole %, and wherein the polymer contains proportions of acid-group containing reactants (100 mole % acid) to hydroxy- and amino-group containing reactants (100 mole % base) such that the value of EQ (base) divided by EQ (acid) is between 0.5 and 2.0, as follows:

(a) at least one difunctional dicarboxylic acid which is not a sulfomonomer;
   (b) from about 2 to about 25 mole % of at least one difunctional sulfomonomer containing at least one metallic sulfonate group or nitrogen-containing non-metallic sulfonate group attached to an aromatic or cycloaliphatic nucleus wherein the functional groups are hydroxy, carboxyl or amino;
   (c) at least one difunctional reactant selected from a glycol or a mixture of a glycol and diamine having two —NRH groups, the glycol containing two —C($R^1$)$_2$—OH groups;
   (d) from none to about 40 mole % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants; and
   (e) greater than 10 mole % of a multifunctional reactant containing at least three functional groups selected from the group consisting of hydroxyl, carboxyl, and a mixture thereof, wherein each R in the (c) and (d) reactants is, independently, a hydrogen atom or an alkyl group of 1 to 4 carbon atoms, and each $R^1$ in the (c) reactant is, independently, a hydrogen atom, an alkyl of 1 to 4 carbon atoms, or an aryl group of 6 to 10 carbon atoms.

2. The polyester of claim 1 wherein reactant (a) is oxalic acid, malonic acid, dimethylmalonic acid, succinic acid, glutaric acid, adipic acid, trimethyladipic acid, pimelic acid, 2,2-dimethylglutaric acid; azelaic acid, sebacic acid, fumaric acid, maleic acid, itaconic acid, 1,3-cyclopentanedicarboxylic acid, 1,2-cyclohexanedicarboxylic acid, 1,3-cyclohexanedicarboxylic acid, 1,4-cyclohexanedicarboxylic acid, phthalic acid, terephthalic acid, isophthalic acid, 2,5-norbornanedicarboxylic acid, 1,4-naphthalic acid, diphenic acid, 4,4'-oxydibenzoic acid, diglycolic acid, thiodipropionic acid, 4,4'-sulfonyldibenzoic acid, 2,5-naphthalenedicarboxylic acid, an ester thereof, or a mixture of any two or more such acids or esters; reactant (b) is a difunctional monomer containing a —SO$_3$M group attached to a nucleus selected from the group consisting of benzene, naphthalene, anthracene, diphenyl, oxydiphenyl, sulfonyldiphenyl, and methylenediphenyl, wherein M is Na+, Li+, K+, Mg++, Ca++, Cu++, Fe++, or Fe+++; reactant (c) is ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, p-xylylenediol, diethylene glycol, triethylene glycol, tetraethylene glycol, pentaethylene glycol, hexaethylene glycol, heptaethylene glycol, octaethylene glycol, nonaethylene glycol, or decaethylene glycol; reactant (d) is a $C_2$ to $C_{20}$ amino alcohol containing one —NRH group and one —C(R)$_2$—OH group, a $C_2$ to $C_{20}$ aminocarboxylic acid, or a diamine; and reactant (e) contains 3 to 6 functional groups selected from the group consisting of hydroxyl, carboxyl, and a mixture thereof.

3. The polyester of claim 1 wherein reactant (a) is isophthalic acid, terephthalic acid, phthalic anhydride (acid), adipic acid, tetrachlorophthalic anhydride, pivalic acid, dodecanedioic acid, sebacic acid, azelaic acid, 1,4-cyclohexanedicarboxylic acid, 1,3-cyclohexanedicarboxylic acid, maleic anhydride, fumaric acid, succinic anhydride (acid), 2,6-naphthalenedicarboxylic acid, glutaric acid, an ester thereof, or a mixture of any two or more such acids or esters; reactant (b) is sodium sulfoisophthalate, sodium sulfoterephthalate, sodium sulfophthalate, sodium 4-sulfo-naphthalene2,7-dicarboxylate, 5-sodiosulfoisophthalic acid, 5-sodiosulfodimethyl isophthalate, lithium 5-sulfoisophthalic acid, dimethyl lithium 5-sulfoisophthalate, potassium 5-sulfoisophthalic acid, dimethyl potassium 5-sulfoisophthalate, 4-sodiosulfophenyl-3,5-dicarbomethoxybenzenesulfonate, 4-lithiosulfophenyl-3,5-dicarbomethoxybenzenesulfonate, 6-sodiosulfo-2-naphthyl-3,5-dicarbomethoxybenzene sulfonate, dimethyl 5-[4-(sodiosulfo)-phenoxy]isophthalate, dimethyl 5-[4-(sodiosulfo)-phenoxy]terephthalate, or 5-[4-(sodiosulfo)phenoxy]isophthalic acid, or any mixture of two or more such acids or derivatives thereof; reactant (c) is ethylene glycol, diethylene glycol, 2,2,4-trimethyl-1,3-pentanediol, 1,4-cyclohexanedimethanol, 1,3-cyclohexanedimethanol, hydroxypivalyl hydroxypivalate, dipropylene glycol, 1,6-hexanediol, 1,10-decanediol, 1,3-butanediol, hydrogenated bisphenol A, 1,4-butanediol or neopentyl glycol; reactant (d) is 5-aminopentanol-1, 4-aminomethylcyclohexanemethanol, 5-amino-2-ethylpentanol-1, 2-(4-β-hydroxyethoxyphenyl)-1-aminoethane, 3-amino-2,2-dimethylpropanol, hydroxyethylamine, 6-aminocaproic acid, caprolactam, omega-aminoundecanoic acid, 3-amino-2-dimethylpropionic acid, 4-(β-aminoethyl)benzoic acid, 2-(β-aminopropoxy)benzoic acid, 4-aminomethylcyclohexanecarboxylic acid, 2-(β-aminopropoxy)cyclohexanecarboxylic acid, ethylenediamine, hexamethylenediamine, 2,2,4-trimethylhexamethylenediamine, 4-oxaheptane-1,7-diamine; 4,7-dioxadecane-1,10-diamine; 1,4-cyclohexanebismethylamine; 1,3-cycloheptamethylenediamine, or dodecamethylenediamine; and reactant (e) is trimethylolpropane, trimethylolethane, glycerine, pentaerythritol, erytritol, threitol, dipentaerythritol, sorbitol, trimellitic anhydride, pyromellitic dianhydride, or dimethylolpropionic acid.

4. The polyester of claim 1 wherein reactant (e) is present in an amount of about 15 to about 30 mole percent.

5. The polyester of claim 1 wherein the ASTM D 4287 viscosity at 200° C. is from about 15 P to about 30 P.

6. The polyester of claim 1 wherein the acid component comprises from about 10 to about 90 mole percent isophthalic acid, about 10 to about 90 mole percent adipic acid, and from about 25 to 2 mole percent 5-sodiosulfoisophthalic acid, and the glycol component comprises from about 65 to about 88 mole percent neopentyl glycol, 1,4-cyclohexanedimethanol, ethylene glycol, or a mixture thereof.

7. The polyester of claim 1 wherein the acid component comprises from about 75 to about 25 mole percent of isophthalic acid, about 75 to about 25 mole percent adipic acid, and about 3 to about 9 mole percent 5-sodiosulfoisophthalic acid, and said glycol component comprises from about 80 to about 85 mole percent neopentyl glycol.

8. The polyester of claim 1 having a weight average molecular weight of about 5,000 to about 25,000, and a number average molecular weight of about 1,000 to about 5,000.

9. The polyester of claim 1 having a weight average molecular weight of about 10,000 to about 20,000, and a number average molecular weight of about 1,500 to about 3,500.

10. The polyester of claim 1 having an acid number less than 10 and a Tg of greater than 30° C.

11. A water-dissipatible polyester having carbonyloxy linking groups in the linear molecular structure wherein up to 80% of the linking groups are carbonylamido linking groups, the polymer having an ASTM D 4287 viscosity of from about 5 P to about 50 P at 200° C., the polymer comprising the reaction products of reactants (a), (b), (c), (d), and (e) or the ester forming or esteramide forming derivatives thereof, wherein all stated mole percentages are based on the total of all acid, hydroxyl and amino group containing reactants being equal to 200 mole %, and wherein the polymer contains proportions of acid-group containing reactants (100 mole % acid) to hydroxy- and amino-group containing reactants (100 mole % base) such that the value of EQ (base) divided by EQ (acid) is between 0.5 and 2.0, as follows:

(a) at least one difunctional dicarboxylic acid which is not a sulfomonomer;

(b) from about 2 to about 25 mole % of at least one difunctional sulfomonomer containing at least one metallic sulfonate group or nitrogen-containing non-metallic sulfonate group attached to an aromatic or cycloaliphatic nucleus wherein the functional groups are hydroxy, carboxyl or amino;

(c) at least one difunctional reactant selected from a glycol or a mixture of a glycol and diamine having two —NRH groups, the glycol containing two —C(R$^1$)$_2$—OH groups;

(d) from none to about 40 mole % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants; and (e) 12 to 35 mole percent of a multifunctional reactant containing at least 3 functional groups selected from the group consisting of hydroxyl, carboxyl, and a mixture thereof, wherein each R in the (c) and (d) reactants is, independently, a hydrogen atom or an alkyl group of 1 to 4 carbon atoms, and each R$^1$ in the (c) reactant is, independently, a hydrogen atom, an alkyl of 1 to 4 carbon atoms, or an aryl group of 6 to 10 carbon atoms.

12. The polyester of claim 11 wherein the functional groups on reactant (e) are hydroxyl.

13. The water dissipatable polyester according to claim 1 wherein the amount of reactant (d) is up to about 40%.

* * * * *